(12) United States Patent
Inoue (10) Patent No.: US 9,146,449 B2
(45) Date of Patent: Sep. 29, 2015

(54) IMAGING LENS-EXCHANGEABLE IMAGE CAPTURING APPARATUS AND CONTROL METHOD THEREFOR

(71) Applicant: CANON KABUSHIKI KAISHA, Tokyo (JP)

(72) Inventor: Koji Inoue, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/629,934

(22) Filed: Sep. 28, 2012

(65) Prior Publication Data

US 2013/0088636 A1    Apr. 11, 2013

(30) Foreign Application Priority Data

Oct. 5, 2011    (JP) ................. 2011-221338

(51) Int. Cl.
*H04N 5/232* (2006.01)
*G03B 17/14* (2006.01)
*G03B 13/36* (2006.01)

(52) U.S. Cl.
CPC .............. *G03B 17/14* (2013.01); *G03B 13/36* (2013.01); *H04N 5/23209* (2013.01); *H04N 5/23212* (2013.01)

(58) Field of Classification Search
CPC ................................................ H04N 5/23212
See application file for complete search history.

(56) References Cited

U.S. PATENT DOCUMENTS

| 2003/0090567 A1* | 5/2003 | Sasaki et al. ............... 348/136 |
| 2005/0140815 A1* | 6/2005 | Nakano et al. ............. 348/345 |
| 2008/0199168 A1 | 8/2008 | Sakaguchi |
| 2009/0051806 A1 | 2/2009 | Haubmann |
| 2009/0180770 A1 | 7/2009 | Honjo et al. |

(Continued)

FOREIGN PATENT DOCUMENTS

| CN | 1637456 A | 7/2005 |
| DE | 35 18 887 C1 | 9/1986 |

(Continued)

OTHER PUBLICATIONS

European Search Report issued on Feb. 21, 2013 that issued in the corresponding European Patent Application No. 12185944.1.

(Continued)

*Primary Examiner* — Lin Ye
*Assistant Examiner* — John H Morehead, III
(74) *Attorney, Agent, or Firm* — Cowan, Liebowitz & Latman, P.C.

(57) ABSTRACT

An imaging lens-exchangeable image capturing apparatus comprises: a detection unit arranged to detect a focus state; a setting unit arranged to cause a user to set correction information for correcting the focus state or correction information for correcting control of a focus position based on the focus state; an acquisition unit arranged to acquire first lens identification information for identifying an attached imaging lens; an input unit arranged to enable the user to input second lens identification information for identifying the attached imaging lens; a storage unit arranged to store, for each imaging lens, the correction information, the first lens identification information, and the second lens identification information in association with each other; and a focus adjustment unit arranged to adjust a focus based on the detection result of the focus state and the correction information.

22 Claims, 4 Drawing Sheets

(56) References Cited

U.S. PATENT DOCUMENTS

| | | | |
|---|---|---|---|
| 2011/0019067 A1 | 1/2011 | Matsumoto et al. | |
| 2012/0082444 A1* | 4/2012 | Yumiki et al. | 396/125 |
| 2012/0154613 A1* | 6/2012 | Honjo et al. | 348/208.4 |
| 2013/0113977 A1* | 5/2013 | Yumiki | 348/333.08 |

FOREIGN PATENT DOCUMENTS

| | | |
|---|---|---|
| JP | 2001-174690 | 6/2001 |
| JP | 2007-240839 A | 9/2007 |
| JP | 2007-328104 A | 12/2007 |
| JP | 2009-009005 A | 1/2009 |
| JP | 2011-059707 A | 3/2011 |
| WO | 2009/016836 A | 2/2009 |

OTHER PUBLICATIONS

Jan. 13, 2015 Chinese Office Action, issued in Chinese Patent Application No. 201210374885.2.

Jul. 31, 2015 Japanese Office Action, issued in Japanese Patent Appliction No. 2011221338.

* cited by examiner

IMAGING LENS-EXCHANGEABLE IMAGE CAPTURING APPARATUS AND CONTROL METHOD THEREFOR

BACKGROUND OF THE INVENTION

1. Field of the Invention

The present invention relates to an imaging lens-exchangeable image capturing apparatus and a control method therefore and, more particularly, a technique of correcting a focus state detected in an imaging lens-exchangeable image capturing apparatus to which an imaging lens exchangeably is attached and detached.

2. Description of the Related Art

In some conventional image capturing apparatuses having a main body unit to which an imaging lens is exchangeably attached and detached, each of the main body unit and imaging lens includes an MPU (Micro Processing Unit) to communicate with each other, thereby implementing a focus adjustment function. More specifically, it is possible to implement optimum focus detection for each imaging lens when the MPU in the main body unit side controls a sensor for detecting a defocus amount for focus detection, and the MPU on the imaging lens side transmits an optimum focus correction value for each imaging lens to the MPU on the main body unit.

For such an image capturing apparatus, so-called focus adjustment for automatic focus adjustment is well known. Focus adjustment is a technique of detecting the individual differences of parts used to tolerances in production or the like, storing, in advance, adjustment values for automatic focus adjustment according to the respective operation characteristics in a non-volatile memory upon shipping from a factory, and performing appropriate focus adjustment based on the adjustment, values.

On the other hand, for example, if a strong impact were to occur on the imaging lens or main body unit when the user drops it, a focus position may shift. Furthermore, if a quick return mirror or the like is arranged in the path of an optical system from the imaging lens to the sensor for detecting a defocus amount, the angle of the mirror may gradually change every time a shutter is opened and closed, and thus the detection accuracy of a defocus amount may decrease, thereby shifting the focus position.

In such a case, the user can bring the imaging lens or main body unit to a service center to adjust the adjustment values stored in the non-volatile memory. Since the locations of service centers are limited, a problem arises in terms of convenience and speediness.

There has been proposed a technique (micro adjustment) of storing, in a main body unit, a correction value which can be freely set by the user, in addition to adjustment values which are stored in a non-volatile memory upon shipping from a factory (see, for example, Japanese Patent Laid-Open No. 2001-174690). According to this technique, the user can freely set a correction value for focus adjustment and also return to the settings upon shipping from a factory.

In the technique disclosed in Japanese Patent Laid-Open No. 2001-174690, however, the user can freely set only one correction value. An image capturing apparatus, such as an exchangeable lens type single-lens reflex camera, to which a plurality of imaging lenses can be attached, therefore, cannot support all the attached imaging lenses.

SUMMARY OF THE INVENTION

The present invention has been made in consideration of the above situation, and enables to set a focus correction value for each of a plurality of imaging lenses while allowing the user to readily specify and delete a correction value for a given imaging lens.

According to a first aspect of the present invention, there is provided an imaging lens-exchangeable image capturing apparatus comprising: a detection unit arranged to detect a focus state; a setting unit arranged to cause a user to set correction information for correcting the focus state detected by the detection unit or correction information for correcting control of a focus position based on the focus state; an acquisition unit arranged to acquire, from an attached imaging lens, first lens identification information for identifying the imaging lens; an input unit arranged to enable the user to input second lens identification information for identifying the attached imaging lens; a storage unit arranged to store, for each of a plurality of different imaging lenses, the correction information set by the setting unit, the first lens identification information, and the second lens identification information in association with each other; and a focus adjustment unit arranged to adjust a focus based on the detection result of the focus state by the detection unit and the correction information stored in the storage unit.

According to a second aspect of the present invention, there is provided a control method for an imaging lens-exchangeable image capturing apparatus, the method comprising: a detection step of detecting a focus state; a setting step of causing a user to set correction information for correcting the focus state detected in the detection step or correction information for correcting control of a focus position based on the focus state; an acquisition step of acquiring, from an attached imaging lens, first lens identification information for identifying the imaging lens; an input step of inputting second lens identification information for identifying the attached imaging lens, which has been input by the user using an input unit; a storage step of storing, in storage unit, for each of a plurality of different imaging lenses, the correction information set in the setting step, the first lens identification information, and the second lens identification information in association with each other; and a focus adjustment step of adjusting the focus based on the detection result of the focus state in the detection step and the correction information stored in the storage step.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

To solve the above-described problem of the conventional technique, if it is configured such that a plurality of correction values for a plurality of different imaging lenses are to be held by modifying the technique disclosed in Japanese Patent Laid-Open No. 2001-174690, an imaging lens model name can be used to identify each of the plurality of imaging lenses on the main body side. A plurality of imaging lenses with the same model name, however, may be used in one image capturing apparatus. In such case, since the same micro adjustment is applied to the imaging lenses with the same model name, this is not good enough to identify each imaging lens to perform focus adjustment.

To identify each of the plurality of imaging lenses, unique lens identification information (for example, a serial number) held by the imaging lens can be used. If, however, a board having unique lens identification information is exchanged, it becomes impossible to associate the imaging lens with the correction value which is held on the main body unit side in association with the unique lens identification information before the exchange of the board, thereby disabling the use of the correction value. To make pieces of lens identification information before and after the exchange of the board coincide with each other, image recognition of exterior carved seals can be performed. This, however, requires a dedicated step and has a disadvantage in terms of cost.

Furthermore, even if the user wants to discriminate between the lenses using a user management number instead of the exterior carved seal of the lens, he/she cannot identify the lens because the main body unit does not include means for acquiring the management number information. If there are a plurality of imaging lenses of the same type, it is difficult to specify an imaging lens among the imaging lenses of the same type for which the setting has been made.

Even if the unique lens identification information is used, the user cannot specify a lens setting value which can be deleted or overwritten when it is necessary to overwrite any of the adjustment values, for example, when the number of adjustment values exceeds that of values which can be held by the main body unit.

This embodiment has been made in consideration of the above problems, and discloses an image capturing apparatus to be explained below.

Figure 1:
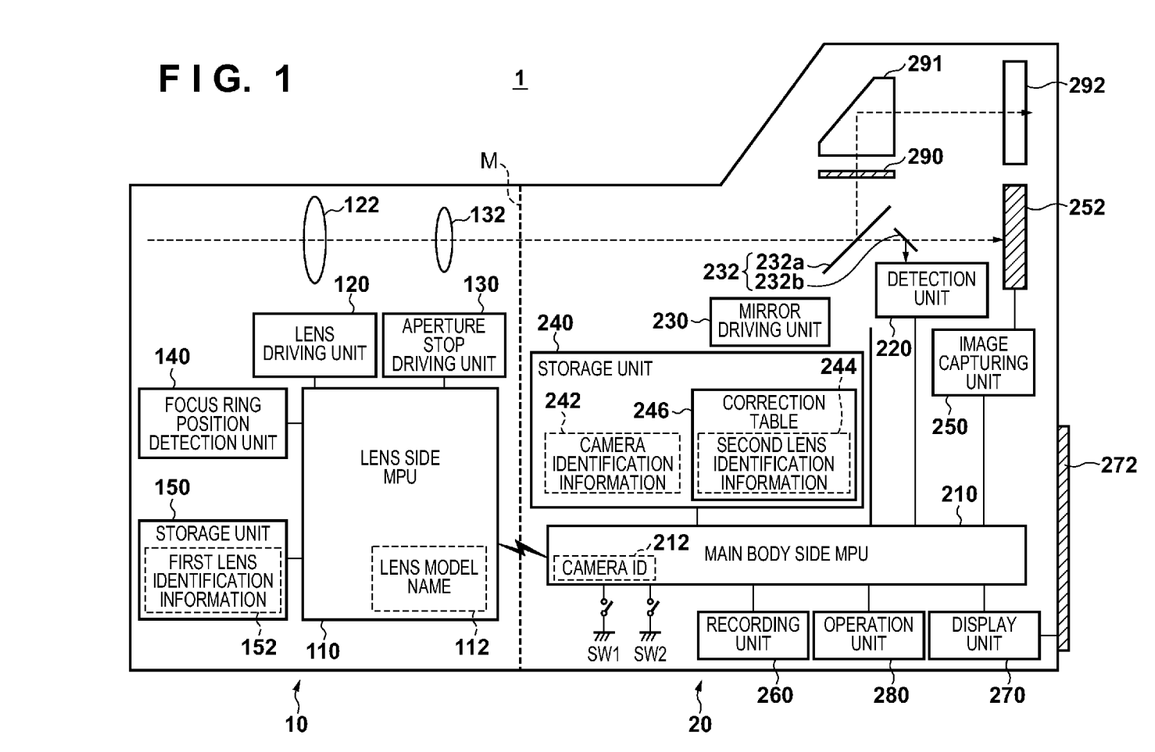
FIG. 1 is a block diagram showing the schematic configuration of an image capturing apparatus according to an embodiment of the present invention.

FIG. 1 is a block diagram showing the schematic configuration of an image capturing apparatus 1 according to the embodiment of the present invention. Assume that the image capturing apparatus 1 is, in this embodiment, an exchangeable lens type single-lens reflex camera, which includes an imaging lens 10 and a main body unit 20. The image capturing apparatus 1 has a focus adjustment function of adjusting the focus position of the imaging lens 10 which is exchangeably attached and detached, through a mount M, to the main body unit 20 for capturing an object.

The imaging lens 10 includes a lens side micro processing unit (MPU) 110, a lens group 122 including a plurality of lenses, and a lens driving unit 120 for driving the lens group 122. The imaging lens 10 also includes an aperture stop 132, and an aperture stop driving unit 130 for driving the aperture stop 132. Furthermore, the imaging lens 10 includes a focus ring position detection unit 140 for detecting the position of a focus ring (not shown) for moving, by a manual operation, a focusing lens included in the lens group 122, and a storage unit 150 including a non-volatile memory such as an EEPROM. The storage unit 150 stores unique first lens identification information 152 for identifying each individual imaging lens 10. It is possible to transmit the first lens identification information 152 stored in the storage unit 150 to the main body unit 20 through the lens side MPU 110 which can communicate with a main body side MPU 210.

The ROM (not shown) of the lens side MPU 110 stores a lens model name 112 indicating the model of the imaging lens 10. When the lens side MPU 110 transmits the lens model name 112 to the main body unit 20, the main body unit 20 can identify the model of the imaging lens 10 attached to itself.

In the main body unit 20, reference numeral 232 denotes a quick return mirror which is formed by a main mirror 232a and a sub-mirror 232b; 252, an image sensor which photoelectrically converts an object image which has passed through the imaging lens 10, and outputs an image signal; and 272, a display panel.

The main body unit 20 also includes the main body side MPU 210, a detection unit 220, a mirror driving unit 230, a storage unit 240, an image capturing unit 250, a recording unit 260, a display unit 270, and an operation unit 280. Furthermore, the main body unit 20 includes a focus plate 290 forming an optical finder, a penta mirror 291, and a finder 292.

The main body side MPU 210 can communicate with the lens side MPU 110 through the mount M. The ROM (not shown) of the main body side MPU 210 stores a camera ID 212 which has been uniquely assigned to each camera model name, and thus can identify the model name of itself. Note that the camera ID 212 is stored in the main body side MPU 210 in this embodiment but may be stored in the storage unit 240 instead.

The detection unit 220 has a function of detecting, in cooperation with the main body side MPU 210, using a well-known method, the defocus amount (focus state) of an object image which has passed through the imaging lens 10 attached to the main body unit 20. More specifically, in this embodiment, a defocus amount necessary for adjusting the focus of the imaging lens 10 is calculated based on the relative displacement amount of two images formed by light beams which have respectively passed through two different pupil areas of the imaging lens 10.

The light beams which have respectively passed through the two different pupil areas of the imaging lens 10 pass through the main mirror 232a formed by a half mirror, are reflected by the sub-mirror 232b, and are then guided to the detection unit 220 by a focus detection optical system (not shown). The detection unit 220 includes the photoelectric conversion elements of a line sensor pair, and outputs, as a potential change, an object image formed on the photoelectric conversion elements. The main body side MPU 210 performs a correlation operation for the potential change output from the detection unit 220 to obtain the relative displacement amount of the two images, and multiplies the relative displacement amount by a unique coefficient, thereby calculating the defocus amount. As described above, in this embodiment, the main body side MPU 210 and detection unit 220 can obtain the defocus amount of the object image which has passed through the imaging lens 10.

The mirror driving unit 230 drives the main mirror 232a and sub-mirror 232b which form the quick return mirror 232. More specifically, the mirror driving unit 230 removes the quick return mirror 232 from a photographing optical path (an optical path between the imaging lens 10 and the image sensor 252) upon start of an operation of shooting an object, and returns the quick return mirror 232 to the photographing optical path upon completion of the operation of shooting the object.

The user can use the operation unit 280 and display unit 270 of the main body unit 20 to set second lens identification information 244, as will be described later.

The storage unit 240 includes a non-volatile memory such as an EEPROM. The storage unit 240 stores unique camera identification information 242 for identifying each individual main body unit 20. For example, the serial number of the main body unit 20 is set as the camera identification information 242 upon shipping from a factory.

For the first lens identification information 152 of each imaging lens 10 which has been attached to the main body unit 20, the storage unit 240 also stores a correction value for correcting the defocus amount detected by the detection unit 220. Note that the correction value for correcting the defocus amount detected by the detection unit 220 is a correction value (micro adjustment correction value) which can be freely set in accordance with a user input. In this embodiment, the storage unit 240 stores a correction table 246 formed by sets of information, each set consisting of the model of the imaging lens 10, the first lens identification information 152 of the imaging lens 10, the second lens identification information set by the user, and the micro adjustment correction value. Note that initial values (for example, all zeros) indicating that the correction table 246 has not been set are set in the correction table 246 upon shipping from a factory.

The image capturing unit 250 causes the main body side MPU 210 to output, as an image, electric charges accumulated in the image sensor 252. The recording unit 260 records, as an image file, the image captured by the image sensor 252 in a recording medium. The display unit 270 has a function of causing the display panel 272 to display an image corresponding to the image file recorded in the recording medium, a setting screen, the second lens identification information 244 set by the user, and the like.

The operation unit 280 includes buttons and dials for setting operations (for example, a shutter speed, an aperture value, a capturing mode, and the like) associated with a capturing operation of the image capturing apparatus 1, and a release button for instructing a capturing operation. Note that the release button includes a switch SW1 for preparing a capturing operation, which is turned on when the user presses the switch halfway, and a switch SW2 for starting a capturing operation, which is turned on when the user fully presses the switch. The operation unit 280 also includes operation members such as a micro adjustment setting switch and a micro adjustment correction value input dial for performing an operation associated with setting of the micro adjustment correction value, and setting the second lens identification information by the user.

When the switch SW1 enters an ON state, the image capturing apparatus 1 having the above configuration starts the focus adjustment function. More specifically, in response to the output (defocus amount) from the detection unit 220, the main body side MPU 210 transmits a lens driving instruction to the lens side MPU 110. Based on the lens driving instruction from the main body side MPU 210, the lens side MPU 110 controls the lens driving unit 120 to drive the focus ring of the imaging lens 10, thereby performing focus adjustment.

When the switch SW2 is turned on, the main body side MPU 210, the image capturing unit 250, the lens side MPU 110, the aperture stop driving unit 130, and the like perform a series of operations for capturing an object. The image capturing apparatus 1 stops the focus adjustment function when the switch SW1 is then turned off.

Even if, however, the defocus amount by the above-described focus adjustment function is zero, the object does not always exist at the in-focus position of the focusing lens due to the tolerances of a focus detection system and the like. It is necessary to store, in the storage unit 240, an adjustment value for setting, to zero, the defocus amount obtained by the main body side MPU 210 and the detection unit 220 when the object is focused on the image sensor 252.

More specifically, the flange focal length (the distance from the imaging lens 10 to the image sensor 252) of the image capturing apparatus 1 is measured, and then a shift amount of the flange focal length with respect to a design value is obtained. After that, a reference lens which focuses on the object (reference object) positioned at a known distance is corrected by the shift amount of the flange focal length.

Then, the defocus amount of the reference object is detected, and the storage unit 240 stores an adjustment value for setting the detected defocus amount to zero. In the operation of the focus adjustment function, a value obtained by adding the adjustment value stored in the storage unit 240 to the defocus amount calculated based on the output of the detection unit 220 is set as a defocus amount. This makes it possible to perform focus adjustment (focus detection) which absorbs the individual differences of each specific image capturing apparatus 1.

Note that in this embodiment, the defocus amount added with the adjustment value stored in the storage unit 240 is further added with a best focus correction value and micro adjustment correction value.

Note that the best focus correction value is a correction value for a shift amount between the focus of an object light beam in a capturing operation and that of an object light beam by the focus detection optical system. The shift amount between the focus of an object light beam in a capturing operation and that of an object light beam by the focus detection optical system is caused by a difference between the spectral sensitivity of the image sensor 252 and that of the detection unit 220 and the spherical aberration of the imaging lens 10 and is, therefore, different for each focus ring position of the imaging lens 10. Note that the best focus correction value is stored in the lens side MPU 110 of the imaging lens 10 attached to the main body unit 20.

The lens side MPU 110 transmits, to the main body side MPU 210 of the main body unit 20, a best focus correction value corresponding to the current focus ring position output from the focus ring position detection unit 140. The main body side MPU 210 enables optimum focus adjustment (focus detection) for each imaging lens 10 by setting, as a defocus amount, a value obtained by adding the best focus correction value to a defocus amount.

On the other hand, the micro adjustment correction value is a correction value which is freely set for each imaging lens 10 (that is, by identifying the imaging lens 10) attached to the main body unit 20 for correcting the defocus amount, as described above.

Figure 2:
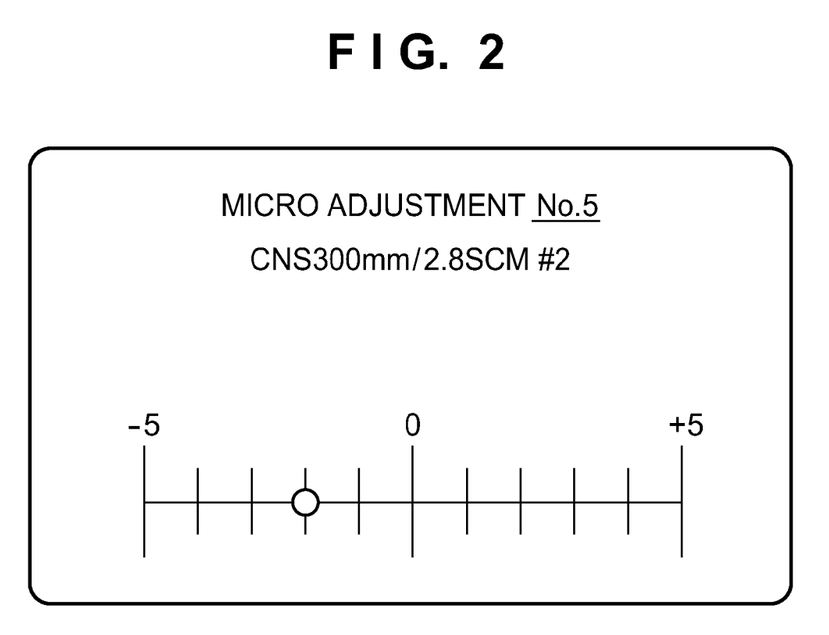
FIG. 2 is a view showing an example of a setting screen for setting a micro adjustment correction value according to the embodiment.

FIG. 2 is a view showing an example of a setting screen for setting the micro adjustment correction value. The user can freely set the micro adjustment correction value by operating the micro adjustment correction value input dial partly forming the operation unit 280 in the setting screen which is displayed on the display panel 272 and is shown in FIG. 2.

In this embodiment, the setting screen shown in FIG. 2 includes entry number "No. 5" in the correction table 246, the model name "SNS300 mm/2.8 SCM" of the imaging lens 10, and number "#2" for identifying the imaging lens 10 with the same model name. Note that the number for identifying the imaging lens 10 with the same model name is a serial number assigned to each imaging lens 10 which is obtained by searching the correction table 246 using the model name of the imaging lens 10.

In the setting screen shown in FIG. 2, the current micro adjustment correction value is indicated by a white circle on a scale bar. The user can change the micro adjustment correction value in a near-focus direction (so that the focus position shifts toward the object) or in a far-focus direction (so that the focus position shifts backward from the object) by operating the micro adjustment correction value input dial.

The micro adjustment correction value input through the setting screen shown in FIG. 2 is written in the correction table 246 as correction data together with the model of the imaging lens 10, the first lens identification information 152 of the imaging lens 10, and the second lens identification information.

The main body side MPU 210 searches the storage unit 240 for the first lens identification information 152 of the imaging lens 10 attached to the main body unit 20, and searches the correction table 246 for a micro adjustment correction value corresponding to the first lens identification information 152. If the micro adjustment correction value corresponding to the first lens identification information 152 of the imaging lens 10 is detected, a value obtained by adding the micro adjustment correction value to the defocus amount calculated based on the output of the detection unit 220 is set as a defocus amount. This makes it possible to perform free focus adjustment depending on the imaging lens 10.

Figure 3:
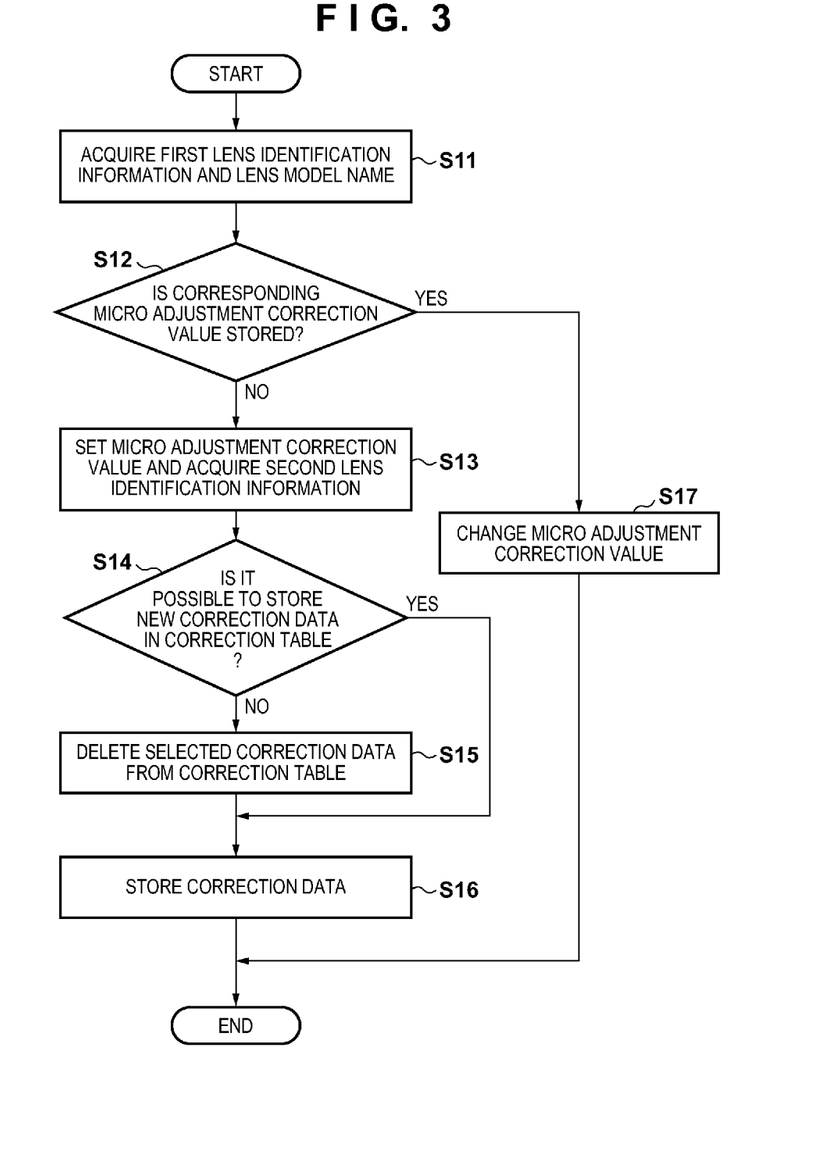
FIG. 3 is a flowchart illustrating a procedure of setting the micro adjustment correction value according to the embodiment.

A procedure of setting the micro adjustment correction value in the image capturing apparatus 1 will be described below with reference to FIG. 3. Setting of the micro adjustment correction value starts when the user operates (presses) the micro adjustment setting switch partly forming the operation unit 280.

In step S11, the main body side MPU 210 acquires, through the lens side MPU 110, the lens model name 112 and the first lens identification information 152 of the imaging lens 10 attached to the main body unit 20.

In step S12, the main body side MPU 210 searches the correction table 246 stored in the storage unit 240 using, as a search key, the first lens identification information 152 acquired in step S11. That is, the main body side MPU 210 determines whether the micro adjustment correction value corresponding to the first lens identification information 152 acquired in step S11 is stored in the correction table 246. If the micro adjustment correction value corresponding to the first lens identification information 152 acquired in step S11 is not stored in the correction table 246, the process advances to step S13; otherwise, the process advances to step S17.

In step S13, since it is determined in step S12 that the micro adjustment correction value is not stored in the correction table 246, a micro adjustment correction value to be added to the correction table 246 is set. In this example, the setting screen shown in FIG. 2 is displayed to allow the user to set the micro adjustment correction value by operating the micro adjustment correction value input dial. Note that since the micro adjustment correction value is not stored in the correction table 246, the open circle indicating the micro adjustment correction value is displayed at the position of "0" on the scale bar. To set the micro adjustment correction value, the second lens identification information is acquired from the user.

Figure 4:
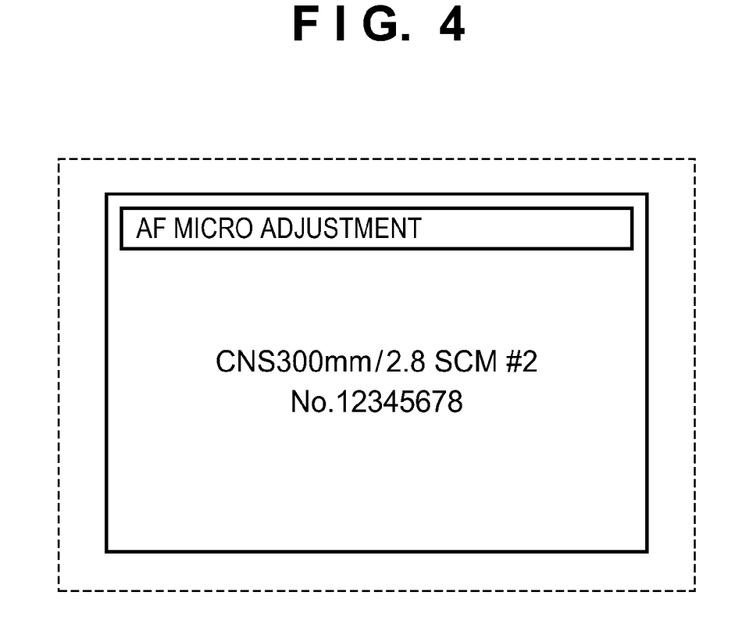
FIG. 4 is a view showing an example of a setting screen for displaying and setting second lens identification information according to the embodiment.

Furthermore, the user sets the second lens identification information 244 in the main body side MPU 210 using the operation unit 280 and display unit 270. FIG. 4 is a view showing an example of a setting screen for displaying and setting the second lens identification information in step S13. Since, at this time, the user can arbitrarily set information with which he/she can identify the imaging lens 10 later on, such as information carved on the lens, and the management number created by the user, he/she can readily specify the setting value and lens later on.

In step S14, the main body side MPU 210 determines whether some memory area of the storage unit 240 is free, that is, whether it is possible to add new correction data to the correction table 246. If it is possible to add new correction data to the correction table 246, the process advances to step S16; otherwise, the process advances to step S15.

In step S15, the main body side MPU 210 displays, through the display unit 270, on the display panel 272, a message such as "there is no free memory area" indicating that it is impossible to store new correction data to the correction table 246. Then, the main body side MPU 210 displays the correction table 246, and prompts the user to select deletion of some correction data of the correction table 246, thereby freeing some memory area of the storage unit 240. At this time, by displaying the second lens identification information on the display unit 270 as shown in FIG. 4, the user can readily identify each individual lens. Upon deletion of the selected correction data, the process advances to step S16.

In step S16, the main body side MPU 210 adds, to the correction table 246, correction data including the first lens identification information 152, the lens model name 112, the second lens identification information 244, and the micro adjustment correction value.

On the other hand, if it is determined in step S12 that the micro adjustment correction value corresponding to the first lens identification information 152 acquired in step S11 is stored in the correction table 246, the process advances to step S17 to change the micro adjustment correction value. In step S17, the setting screen shown in FIG. 2 is displayed, and the user operates the micro adjustment correction value input dial, thereby changing the micro adjustment correction value, and storing the changed micro adjustment correction value in the correction table 246.

Upon completion of step S16 or S17, the processing of setting the micro adjustment correction value ends.

As described above, the image capturing apparatus 1 of this embodiment stores the micro adjustment correction value corresponding to each imaging lens 10 in association with the first lens identification information 152 unique to each imaging lens 10, and the second lens identification information set by the user. In the operation of the focus adjustment function, the image capturing apparatus 1 corrects the defocus amount calculated based on the output of the detection unit 220 using the micro adjustment correction value which is stored in the storage unit 240 and corresponds to the lens identification information 152 of the imaging lens 10 attached to the main body unit 20.

Then, the image capturing apparatus 1 adjusts the focus position of the imaging lens 10 so that the corrected defocus amount becomes zero. Even if a plurality of imaging lenses with the same model name are used in one image capturing apparatus, therefore, it is possible to identify each imaging lens, and perform optimum focus adjustment for each imaging lens. In other words, according to this embodiment, micro adjustment effectively works even in the exchangeable lens type single-lens reflex camera.

When the amount of the correction data exceeds the memory capacity available for storage of micro adjustment correction values, the user can readily delete an unnecessary correction data as the second lens identification information set by the user is displayed.

Although the preferred embodiment of the present invention has been described above, the present invention is not limited to this, as a matter of course. Various changes and modifications can be made within the spirit and scope of the present invention. For example, the present invention is not limited to the exchangeable lens type single-lens reflex camera, and is applicable to an optical equipment including a focus detection apparatus, such as a video camera.

In the above-described embodiment, a case in which the model of the imaging lens 10, the first lens identification information 152 of the imaging lens 10, the second lens identification information, and the micro adjustment correction value are stored as correction data in the correction table 246 has been explained. However, at least the first lens identification information 152, the second lens identification information, and the micro adjustment correction value need only be stored.

In the above-described embodiment, the focus ring position detection unit 140 detects the position of a focus ring for moving the focusing lens. The present invention is not limited to this, and it is only necessary to detect the position of the focusing lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-221338, filed on Oct. 5, 2011 which is hereby incorporated by reference herein in its entirety.

What is claimed is:

1. An imaging lens-exchangeable image capturing apparatus comprising:
   a detection unit arranged to detect a focus state;
   a setting unit arranged to cause a user to set correction information for correcting the focus state detected by said detection unit or correction information for correcting control of a focus position based on the focus state;
   an acquisition unit arranged to acquire, from an attached imaging lens, first lens identification information for identifying the imaging lens;
   an input unit arranged to enable the user to input second lens identification information for identifying the attached imaging lens;
   a second acquisition unit arranged to acquire, from an attached imaging lens, third lens identification information for identifying the imaging lens;
   a storage unit arranged to store, for each of a plurality of different imaging lenses, the correction information set by said setting unit, the first lens identification information, the second lens identification information, and the third lens identification information in association with each other; and
   a focus adjustment unit arranged to adjust a focus based on the detection result of the focus state by said detection unit and the correction information stored in said storage unit.

2. The apparatus according to claim 1 further comprising:
   a display unit arranged to display, when correction information is deleted from said storage unit, the second lens identification information corresponding to the correction information.

3. The apparatus according to claim 1, wherein said focus adjustment unit is arranged to correct the focus state detected by said detection unit using the correction information, corresponding to the first lens identification information acquired by said acquisition unit, of the correction information stored in said storage unit, and adjusts the focus based on the corrected focus state.

4. The apparatus according to claim 1, wherein said focus adjustment unit is arranged to adjust a correction value for controlling the focus position based on the focus state using the correction information, corresponding to the first lens identification information acquired by said acquisition unit, of the correction information stored in said storage unit.

5. The apparatus according to claim 1, wherein the second lens identification information is settable by the user by a dial operation.

6. The apparatus according to claim 1, wherein the third lens identification information includes information representing a focal length of the attached imaging lens.

7. The apparatus according to claim 1, wherein the third lens identification information includes information representing an F-number of the attached imaging lens.

8. A control method for an imaging lens-exchangeable image capturing apparatus, the method comprising:
   a detection step of detecting a focus state;
   a setting step of causing a user to set correction information for correcting the focus state detected in the detection step or correction information for correcting control of a focus position based on the focus state;
   an acquisition step of acquiring, from an attached imaging lens, first lens identification information for identifying the imaging lens;
   an input step of inputting second lens identification information for identifying the attached imaging lens, which has been input by the user using an input unit;
   a second acquisition step of acquiring, from an attached imaging lens, third lens identification information for identifying the imaging lens;
   a storage step of storing, in storage unit, for each of a plurality of different imaging lenses, the correction information set in the setting step, the first lens identification information, the second lens identification information, and the third lens identification information in association with each other; and
   a focus adjustment step of adjusting the focus based on the detection result of the focus state in the detection step and the correction information stored in the storage step.

9. An imaging lens-exchangeable image capturing apparatus comprising:
   a detection unit arranged to detect a focus state;
   a setting unit arranged to cause a user to set correction information for correcting the focus state detected by said detection unit;
   an acquisition unit arranged to acquire, from an attached imaging lens, first lens identification information and second lens identification information, wherein the first lens identification information and the second lens identification information are information for identifying the imaging lens and the second lens identification classifies the imaging lens more than the first lens identification;
   an input unit arranged to enable the user to input third lens identification information for identifying the attached imaging lens;
   a storage unit arranged to store, for each of a plurality of different imaging lenses, the correction information set by said setting unit, the first lens identification information, the second lens identification information, and the third lens identification information in association with each other; and a focus adjustment unit arranged to adjust a focus based on the detection result of the focus state by said detection unit and the correction information stored in said storage unit.

10. The apparatus according to claim 9, further comprising a display unit arranged to display, when correction information is deleted from said storage unit, the third lens identification information corresponding to the correction information.

11. The apparatus according to claim 9, wherein said focus adjustment unit is arranged to correct the focus state detected by said detection unit using the correction information, corresponding to the first lens identification information acquired by said acquisition unit, of the correction information stored in said storage unit, and adjusts the focus based on the corrected focus state.

12. The apparatus according to claim 9, wherein said focus adjustment unit is arranged to adjust a correction value for controlling the focus position based on the focus state using the correction information, corresponding to the first lens identification information acquired by said acquisition unit, of the correction information stored in said storage unit.

13. The apparatus according to claim 9, wherein the third lens identification information is settable by the user by a dial operation.

14. The apparatus according to claim 9, wherein the second lens identification information includes information representing a focal length of the attached imaging lens.

15. The apparatus according to claim 9, wherein the second lens identification information includes information representing an F-number of the attached imaging lens.

16. A control method for an imaging lens-exchangeable image capturing apparatus, the method comprising:
 a detection step of detecting a focus state;
 a setting step of causing a user to set correction information for correcting the focus state detected in the detection step;
 an acquisition step of acquiring, from an attached imaging lens, first lens identification information and second lens identification information, wherein the first lens identification information and the second lens identification information are information for identifying the imaging lens and the second lens identification classifies the imaging lens more than the first lens identification;
 an input step of inputting third lens identification information for identifying the attached imaging lens, which has been input by the user using an input unit; a storage step of storing, in storage unit, for each of a plurality of different imaging lenses, the correction information set in the setting step, the first lens identification information, the second lens identification information, and the third lens identification information in association with each other; and
 a focus adjustment step of adjusting the focus based on the detection result of the focus state in the detection step and the correction information stored in the storage step.

17. The apparatus according to claim 1, further comprising:
 a display unit arranged to display the second lens identification information and the correction information corresponding to the second lens identification information.

18. The apparatus according to claim 17, wherein the display unit further displays the third lens identification information corresponding to the second lens identification information.

19. The apparatus according to claim 18, wherein the display unit further displays the first lens identification information corresponding to the second lens identification information.

20. The apparatus according to claim 9, further comprising:
 a display unit arranged to display the third lens identification information and the correction information corresponding to the second lens identification information.

21. The apparatus according to claim 20, wherein the display unit further displays the second lens identification information corresponding to the third lens identification information.

22. The apparatus according to claim 21, wherein the display unit further displays the first lens identification information corresponding to the third lens identification information.

* * * * *